United States Patent [19]
Melzer

[11] Patent Number: 6,053,065
[45] Date of Patent: Apr. 25, 2000

[54] SPINDLE DRIVE

[75] Inventor: Peter Melzer, Kiel, Germany

[73] Assignee: Heidelberger Druckmaschinen Aktiengesellschaft, Kiel, Germany

[21] Appl. No.: 09/077,501
[22] PCT Filed: Nov. 26, 1996
[86] PCT No.: PCT/DE96/02267
§ 371 Date: Sep. 14, 1998
§ 102(e) Date: Sep. 14, 1998
[87] PCT Pub. No.: WO97/20154
PCT Pub. Date: Jun. 5, 1997

[30] Foreign Application Priority Data

Nov. 30, 1995 [DE] Germany .................. 195 44 575

[51] Int. Cl.⁷ .................. F16H 27/02; F16H 1/18
[52] U.S. Cl. .................. 74/89.15; 74/424.8 A; 74/441; 74/459
[58] Field of Search .................. 74/89.15, 424.8 A, 74/441, 459, 490.09

[56] References Cited

U.S. PATENT DOCUMENTS 2,493,000  1/1950  Linsley .
4,954,032  9/1990  Morales .................. 74/424.8 A X
5,303,606  4/1994  Kokinda .

FOREIGN PATENT DOCUMENTS 344877  4/1960  Sweden .

Primary Examiner—David A. Bucci
Assistant Examiner—Colby Hansen
Attorney, Agent, or Firm—Hill & Simpson

[57] ABSTRACT

A spindle drive with a spindle and a spindle nut which moves on the spindle and is used for high precision drive of a linearly movable device is provided. The spindle nut comprises a base block connected to the movable device and having a bore extending axially to the spindle, at least one sliding nut segment being fastened to the base block and with a thread resting on the spindle. The spindle nut also comprises at least one other sliding nut segment which can be pressed in a resilient manner on the spindle using extension springs. An adjusting device is also provided which, depending on the direction of linear movement, causes a thread flank of the sliding nut segment to rest against the thread flank of the spindle sliding in the direction of linear movement, and one of the thread flanks of the other sliding nut segment is pressed on the other thread flank of the spindle which does not slide in the direction of linear movement.

12 Claims, 6 Drawing Sheets

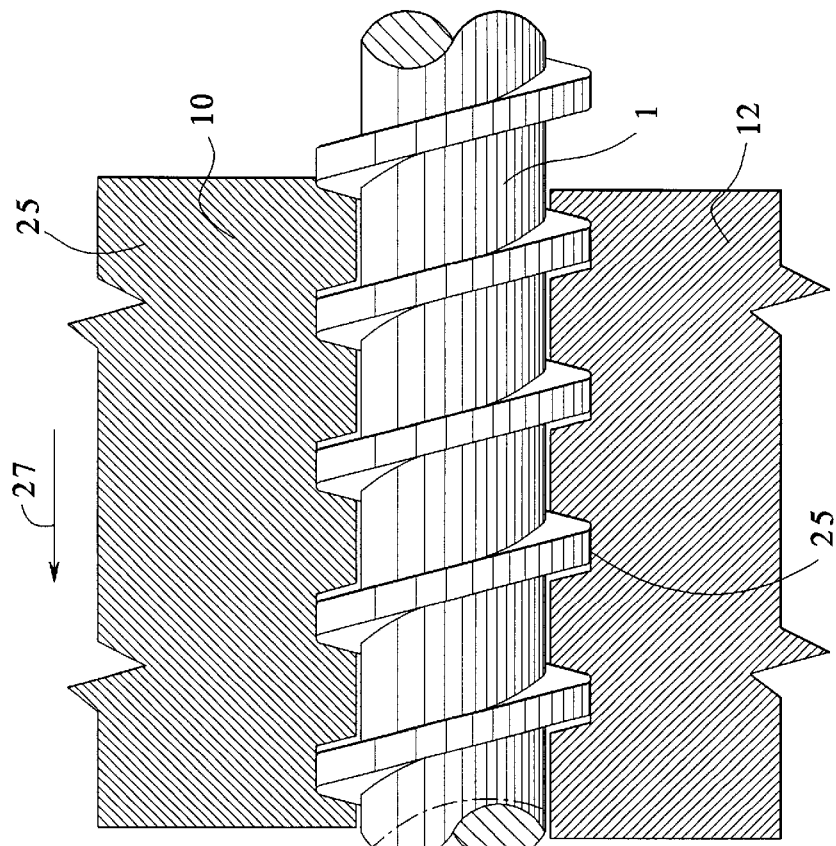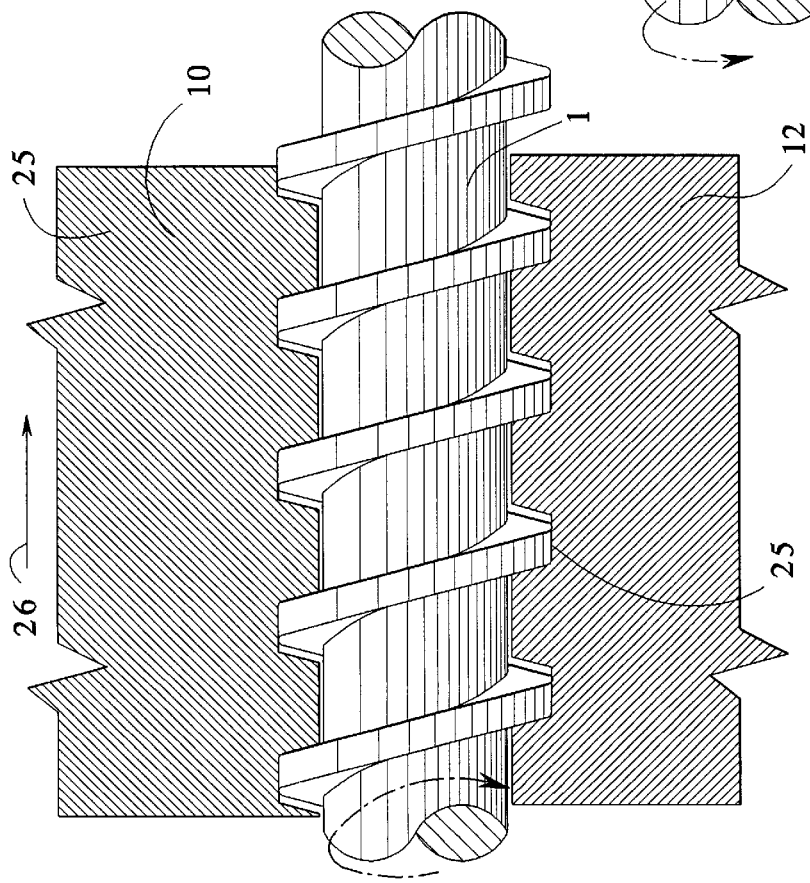

SPINDLE DRIVE

BACKGROUND OF THE INVENTION

The invention is directed to a spindle drive with a spindle and a spindle nut running thereon for the high-precision drive of a linearly movable device.

Spindle drives are employed, for example, in electronic reproduction technology in electronic recording devices for the point-by-point and line-by-line exposing of recording materials, also referred to as output scanners, exposers or recorders.

In an electronic recording device of the flatbed type, the recording material to be exposed is chucked on a linearly movable table or carriage, and the recording element is stationarily arranged. Given a recording device of the inside-drum type, recording material is located in a stationary, cylindrical segment-like holder, and the recording element is mounted on a linearly movable table or carriage. The table or carriage is mechanically rigidly connected to a spindle nut with which the rotary motion of a spindle driven by a motor is converted into a linear motion of the table or carriage.

Required, among other things, in order to achieve a good recording quality, particularly in the rastered exposure of recording materials, is a uniform linear speed of the table or the carriage that is essentially dependent on the quality of the spindle drive. Given recording devices that work in a start/stop mode, the spindle drive must—beyond this—enable a high precision in the positioning of the table or carriage along the spindle. The synchronism and positioning precision should thereby be assured in both directions of the linear motion.

CH-A-344 87 already discloses a two-part spindle nut for a spindle. The spindle nut is composed of two slide nut segments that are guided by a guide member movable in the radial direction relative to the spindle and in anti-tilt fashion.

A uniform linear motion and a high positioning precision cannot be assured in all instances with the known two-part spindle nut. There is the conflict in goal between a spindle nut lying as closely as possible against the spindle that, however, tends to seize at the spindle, and an easily movable spindle nut with an associated slack that disadvantageously deteriorates the uniformity of the linear motion and the positioning precision.

U.S. Pat. No. 2,493,000 discloses that axial sidewall play between slide nut segments and a spindle be eliminated with a spring. The elimination of the sidewall play, however, does not occur dependent on the selectable direction of a linear motion of an element driven by the spindle.

SUMMARY OF THE INVENTION

It is therefore an object of the present invention to improve a traditional spindle drive such that a high uniformity of the linear motion of the spindle nut and a high positioning precision along the spindle is achieved in both motion directions of a device driven by the spindle drive.

According to the present invention, a spindle drive is provided having a spindle and a spindle nut running on the spindle for a high-precision drive of a linearly movable device. The spindle nut has a base block connected to the movable device. A bore proceeds axially relative to the spindle for a loose passage of the spindle therethrough. A slide nut segment connects to the base block having a thread supported at the spindle. A further floating slide nut segment has a thread resiliently supported at the spindle and resiliently attached to at least one of the base block and the slide nut segment, but which can have a floating movement relative to the slide nut segment. At least one slide surface is displaceable in an axial direction, said slide surface being arranged between at least one of the slide nut segment and the base block and the further floating slide nut segment. An adjustment mechanism is provided having a spring biased thrust element coupled to the base block with which the resiliently held further floating slide nut segment is displaceable in an axial direction of the spindle relative to the slide nut segment arranged at the base block. The floating base block, the slide nut segment, adjustment mechanism, and the further slide nut segment are designed and arranged with respect to each other such that dependent on a selectable first direction of linear motion, a first thread sidewall of the thread of the slide nut segment as against a first thread sidewall of a thread of the spindle pushing in a direction of the linear motion and a second thread sidewall of the thread of the further floating side nut segment is pressed with a defined force against a second thread sidewall of the thread of the spindle nut pushing in the direction of the linear motion, and in a second direction of linear motion opposite the first, the second thread sidewall of the thread of the slide nut segment lies against the second thread sidewall of the thread of the spindle pushing in the second direction of the linear motion and a first thread sidewall of the thread of the further floating slide nut segment is pressed with a defined force against the first thread sidewall of the thread of the spindle not pushing in the second direction of the linear motion.

The invention is explained in greater detail below on the basis of FIGS. 1 through 5.

BRIEF DESCRIPTION OF THE DRAWINGS

FIG. 5 shows simplified, excerpted sections through the slide nut segments and through the spindle.

DESCRIPTION OF THE PREFERRED EMBODIMENTS

Figure 1:
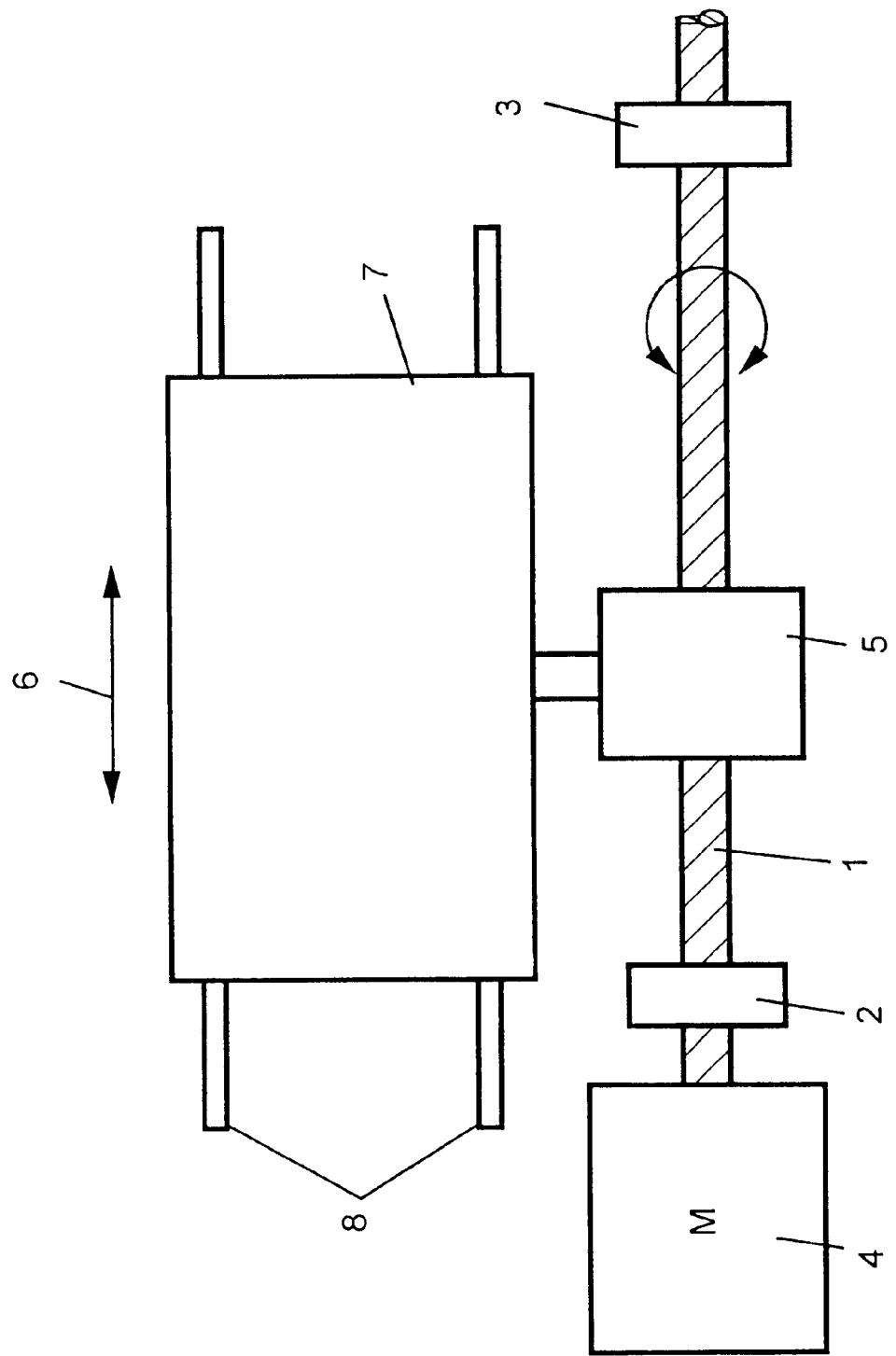
FIG. 1 is a basic applied example of a spindle drive with a spindle and a spindle nut.

FIG. 1 shows a fundamental applied example of a spindle drive. A spindle 1 is rotatably seated with spindle bearing 2, 3 and is driven by a motor 4. The rotary motion of the spindle 1 is converted by a spindle nut 5 on the spindle 1 into a linear motion 6 whose direction is dependent on the rotational sense of the spindle 1. The spindle nut 5 is rigidly connected to a table 7 that is guided by two longitudinal guides 28. When the spindle drive is employed in an electronic recording device (exposer, recorder) of the flatbed type, a recording material to be exposed is mounted on the table 7, this recording material being exposed point-by-point and line-by-line by a stationary recording element. The recording element is mounted on the table 7 given a recording device of the inside-drum type, whereby the recording material to be exposed is situated in a device of the inside-drum type, whereby the recording material to be exposed is situated in a stationary, cylindrical segment-like holder. The spindle drive of the invention is described in greater detail below.

Figure 2:
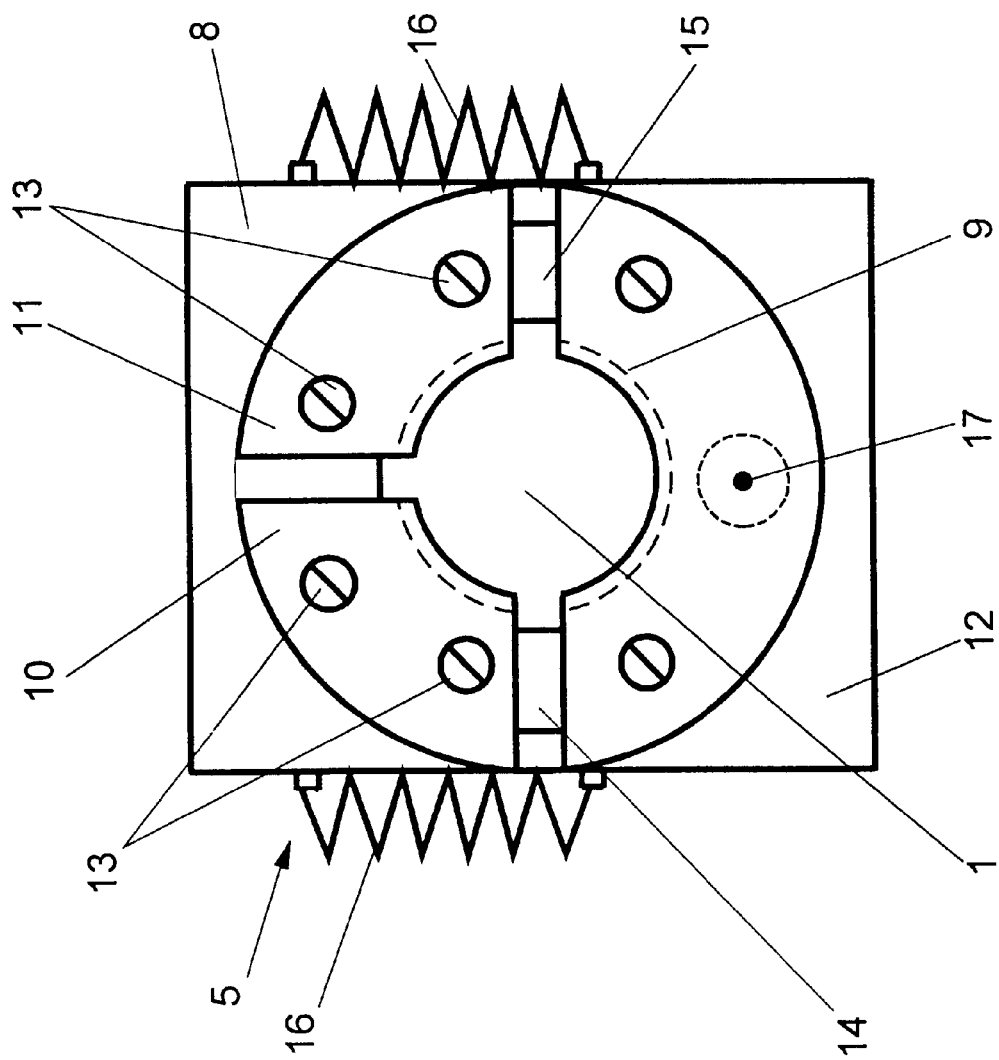
FIG. 2 is a plan view onto an end face of the spindle nut in the axial direction of the spindle.

FIG. 2 shows a plan view onto an end face of the spindle nut 5 in an axial direction of the spindle 1. The spindle nut 5 is basically composed of a base block 8 surrounding the spindle with a bore 9 for the spindle 1, of at least two upper slide nut segments 10, 11 arranged above the spindle 1 and of at least one lower floating slide nut segment 12 arranged under the spindle 1.

The inside surfaces of the hollow-cylindrical segment-like slide nut segments 10, 11, 12 are designed as a thread that engage into the thread of the spindle 1. The profile of the thread of the slide nut segments 10, 11, 12 approximately corresponds to the profile of the respectively employed spindle 1. However, width and depth of the thread of the slide nut segments 10, 11, 12 are smaller than the corresponding width and depth of the thread of the spindle 1 employed. An intentional axial slack between slide nut segments 10, 11, 12 and spindle 1 arises due to the different widths of the nut thread and of the spindle thread, as a result of which the spindle nut 5 and, thus the elements coupled thereto as well, can be easily moved back and forth along the spindle 1.

In the illustrated exemplary embodiment, two upper slide nut segments 10, 11 having a quarter-circular cross-section and a lower floating slide nut segment 12 having a semicircular cross-section are provided. As can be seen from FIG. 3, the slide nut segments 10, 11, 12 comprise axial lengths exceeding their diameter. The slide nut segments 10, 11, 12 are advantageously fabricated of a hollow-cylindrical slide nut that surrounds the employed spindle 1 with a radial slack. The upper slide nut segments 10, 11 are arranged at the base block 8 adjustable essentially in the radial direction relative to the spindle 1 and can be fixed to the base block 8 with screws 13. For the adjustment of the upper slide nut segments 10, 11, the mounted spindle nut 5 is expediently positioned in a non-sagging region of the spindle 1, i.e. in the proximity of a spindle bearing 2, 3. In this position, the upper slide nut segments 10, 11 are manually pressed against the spindle 1 and are then fixed to the base block 8 with the screws 13, as a result of which the radial slack of the upper slide nut segments 10, 11 with respect to the spindle 1 is minimized.

Figure 3:
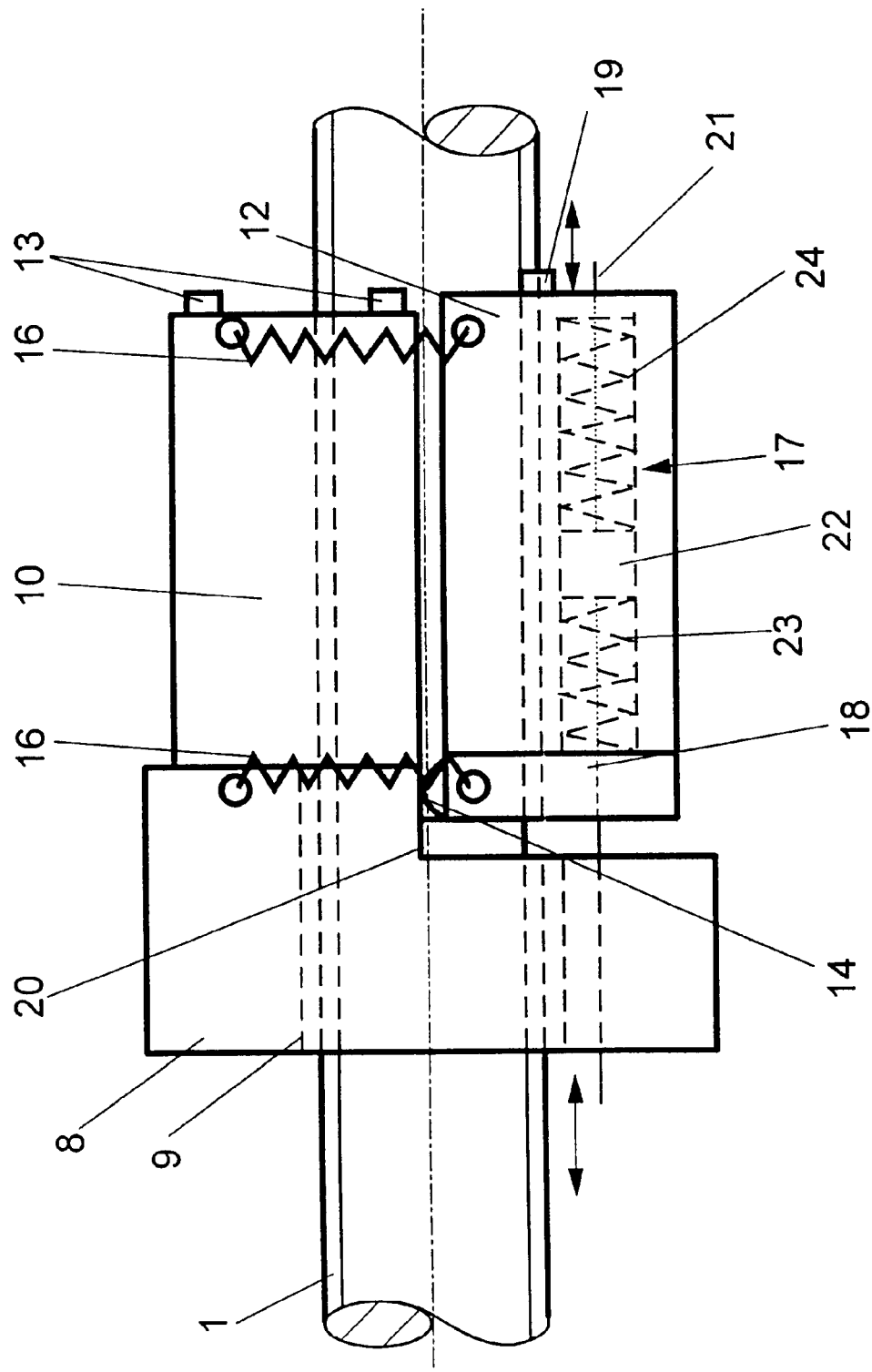
FIG. 3 is a side view of the spindle nut.

As can be seen in greater detail in FIG. 3, the lower slide nut segment 12 comprises at least two slide feet 14, 15 in the region facing toward the base block 8 that are supported at the base block 8 and ensure a defined spacing between the upper slide nut segments 10, 11 and the lower slide nut segment 12 in that region of the slide nut segments 10, 11, 12 facing toward the base block 8.

The spindle nut 5 also comprises tension springs 16. The tension springs 16 effect a tensile force between the rigid unit formed of the base block 8 and the upper slide nut segments 9, 10 and the lower slide nut segment 12. The elastic spindle 1 sagging between the spindle bearings is lifted up from the lower slide nut segment 12 with the tension springs 16 in the region of the spindle nut 5 and is pressed against the upper slide nut segments 10, 11 with a defined force, as a result of which an exact guidance of the spindle 1 is ensured.

What the resilient seating of the slide nut segments 10, 11, 12 against the spindle 1 also achieves is that a grinding of the spindle 1 into the material of the slide nut segments 10, 11, 12, which cannot be prevented, does not lead to irregularities and uncontrollable differential movements of the thread sidewalls of the spindle thread relative to the spindle sidewalls of the nut thread.

The spindle nut 5 also comprises an adjustment mechanism 17 arranged under the spindle, the structure and functioning thereof to be explained later.

The base block 8 represents a rigid connecting element between the part to be moved, for example the table 7 of FIG. 1, and the upper slide nut segments 10, 11 or the spindle 1 itself.

By displacement and turning relative to the part to be moved, the base block 8 can be adjusted within certain limits in a plane perpendicular to the plane of the drawing, as a result of which the upper slide nut segments 10, 11 can be set in the correct angle relative to the spindle 1.

FIG. 3 shows a side view of the spindle nut 5. The slide feet 14, 15, which, for example, are hemispherically designed, are located at the outside surface of a closure cover 18 having a semicircular cross-section that is attached to that end face of the lower slide nut segment 12 facing toward the base block 8. During assembly, the closure cover 18 is first aligned with reference to the base block 8, and the lower slide nut segment 12 is then placed adjusted against the closure cover 18 with screws 19 in alignment with the spindle 1 or with the upper slide nut segments 10, 11.

The slide feet 14, 15 are supported on a seating surface 20 formed by a recess in the base block 8.

The tension springs 16, four tension springs in the exemplary embodiment, have their one ends attached in pairs to the end-face regions of the lower slide nut segment 12, whereas the other ends of the tension springs 16 are secured to the base block or to the upper slide nut segments 10, 11. The tension springs 16 also determine the seating force of the two slide feet 14, 15 on the seating surface 20.

The slide feet 14, 15 in conjunction with the tension springs 16 assure an easy movement of the lower slide nut segments 12 relative to the upper slide nut segments 10, 11 in a plane perpendicular to the plane of the drawing, as a result whereof the movable, lower slide nut segment 12 is advantageously automatically set into the correct position relative to the spindle 1.

Over and above this, the lower slide nut segment 12 can execute a slight tilting motion in the direction of the spindle 1 around the points of contact of the slide feet 14, 15 with the seating surface 20 in the base block 8, as a result whereof an unavoidable grinding of the spindle 1 into the material of the slide nut segments 10, 11, 12 is compensated in a preferred way by automatic readjustment of the slide nut segments 10, 11, 12 without quality loss.

Figure 4A:
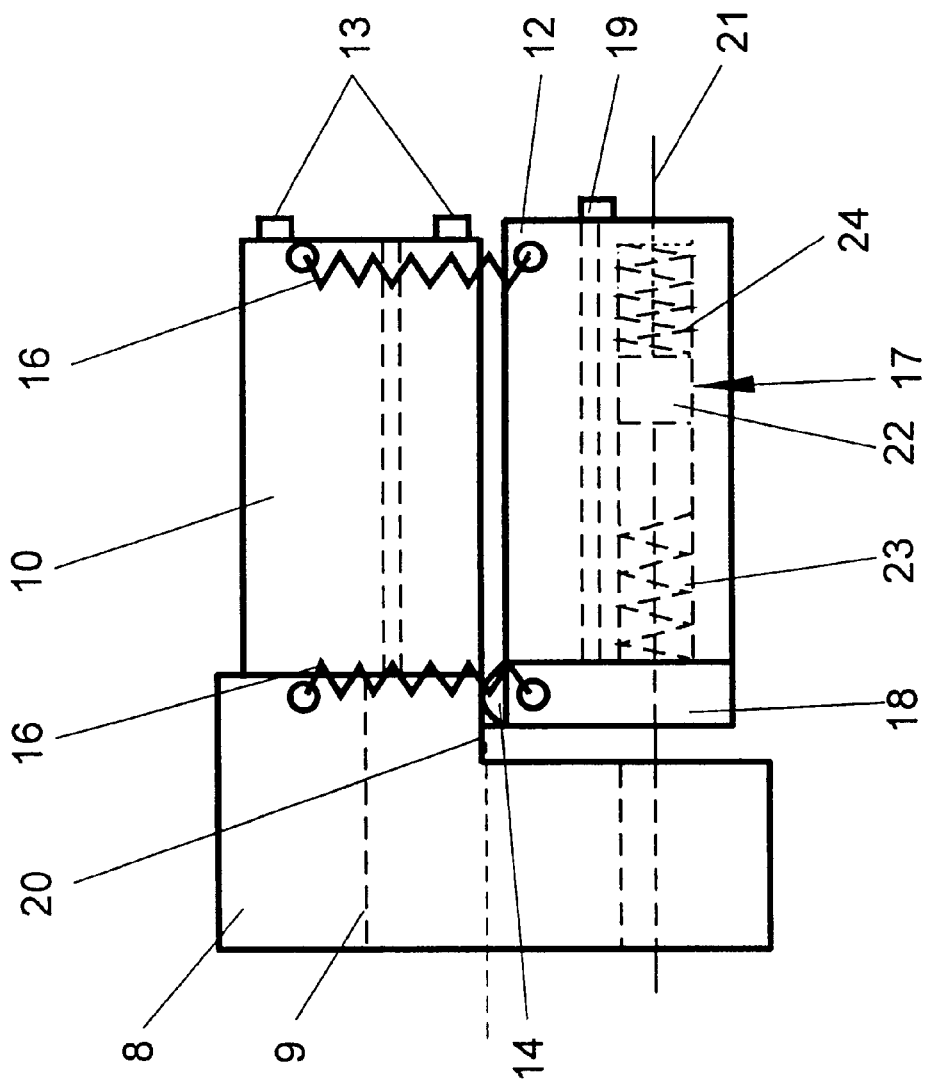
FIG. 4 illustrates the two switch positions of an adjustment mechanism.
Figure 4B:
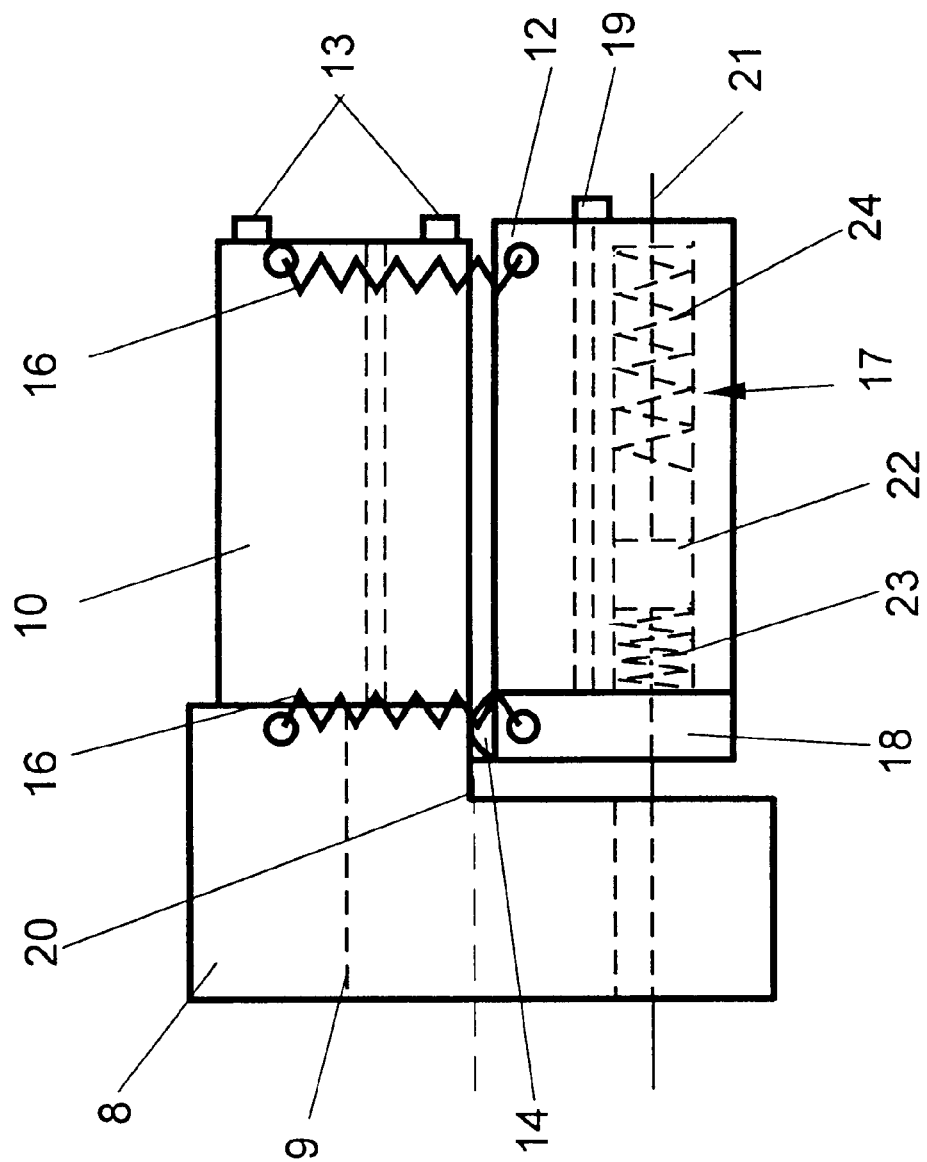

The adjustment mechanism 17 is attached within the lower slide nut segment 12. The adjustment mechanism essentially comprises a connecting rod 21 displaceable in the axial direction of the spindle 1, a thrust element 22 being secured to the connecting rod 21 and two compression springs 23, 24 to the left and right of the thrust element 22 that embrace the connecting rod 21. The connecting rod 21 is supported at the base block 8. A controlled axial movement of the connecting rod 21 into two actuating positions to the left and right of a neutral force, middle position shown in FIG. 2 permits the thrust element 22 to compress either the one or the other compression spring 23, 24, as a result whereof a correspondingly directed axial pressing power is initiated onto the lower slide nut segment 12. The two actuating positions of the adjustment mechanism 17 are shown in FIG. 4a and FIG. 4b. The axial displacement of the connecting rod 21 into the two actuating positions can preferably be implemented with the assistance of a suitable electrically controlled adjustment element, for example with the assistance of a motor.

FIG. 4a and FIG. 4b show the two actuating positions of the adjustment mechanism 17 in the lower slide nut segment 12 of the spindle nut 5. The right-hand compression spring 24 is compressed in the actuating position according to FIG. 4a, as a result whereof an axial pressing power directed toward the right is exerted onto the lower slide nut segment 12. By contrast thereto, the left-hand compression spring 23 is compressed in the actuating position according to FIG. 4b, as a result of which an axial pressing power directed toward the left is exerted onto the lower slide nut segment 12.

For illustrating the functioning of the spindle drive of the invention, FIG. 5a and FIG. 5b show the engagement of the thread of the slide nut segments 10, 11, 12 of the spindle nut 5 into the thread of the spindle 1 in simplified, excerpted sectional views. It can be seen that the profile of the nut thread, a trapezoidal profile in the illustrated example, approximately corresponds to the profile of the spindle thread, and that there is an axial slack between the nut thread and the spindle thread due to the somewhat smaller profile width of the nut thread compared to the profile width of the spindle thread. It can also be seen that the valley surfaces 25 of the nut thread are respectively supported on the worked outside or generated surface of the spindle 1 as a reference surface for the radial positioning, whereby the seating of the upper slide nut segments 10, 11 at the generated surface of the spindle 1 is achieved by the adjustment of the upper slide nut segments 10, 11, and the seating of the lower slide nut segment 12 at the generated surface of the spindle 1 is achieved by the tension springs 16.

This type of guidance of the slide nut segments 10, 11, 12 at the worked generated surface of the spindle 1 assures that the thread sidewalls of the slide nuts 10, 11, 12 are always in contact with the thread sidewalls of the spindle 1 at a defined sidewall height, as a result of which the thread sidewalls of the nut thread and of the spindle thread always slide on one another with constant pressing power. A high precision in the conversion of the rotary motion of the spindle 1 into the linear motion of the spindle nut is thereby advantageously achieved. The precisions can be further enhanced by employing precision spindles without having to enhance the fabrication precision for the spindle nut 5. A high-precision generated surface is already required in the manufacture of precision spindles as a reference surface for the grinding process; this can then preferably also be employed as a reference surface in the support of the slide nut segments 10, 11, 12.

A seating of the thread sidewalls of the nut thread and of the thread sidewalls of the spindle thread that is dependent on the desired direction of the linear motion can be advantageously achieved with the adjustment mechanism 17.

Given the set position of the adjustment mechanism 17 shown in FIG. 4a, the left thread sidewalls of the upper slide nut segments 10, 11 and of the spindle 1 respectively mesh, as a result whereof the upper slide nut segments 10, 11, the base block 1 and, thus, the elements mechanically coupled to the base block 1 as well are pushed in the direction (useful direction) of an arrow 26, whereas the right thread sidewalls of the lower slide nut segment 12 and of the spindle 1 resiliently mesh (FIG. 5a).

Given the set position of the adjustment mechanism 17 shown in FIG. 4b, by contrast the right thread sidewalls of the upper slide nut segments 10, 11 and of the spindle 1 mesh, as a result of which upper slide nut segments 10, 11 and the mechanically coupled elements are pushed in the direction of an arrow 27, whereas the left thread sidewalls of the lower slide nut segment 12 and of the spindle 1 resiliently mesh (FIG. 5b).

Due to the above-described, directionally dependent reversing given the spindle drive of the invention, the thread sidewalls of the spindle thread always "push" the thread sidewalls of the thread of the upper slide nut segments 10, 11 in the direction of the useful linear motion without axial slack. A directionally dependent, rigid coupling between spindle 1 and the elements rigidly coupled via the spindle nut 5 arises, without the risk that speed-dependent, disturbing self-oscillations occur.

The motor 4, for example a stepping motor, that drives the spindle 1 reacts with corresponding load angle fluctuations given torque fluctuations. The result of load angle fluctuations are changes in angular velocity of the spindle 1 and, thus, disturbing changes of the linear speed. In order to achieve a constant linear velocity, the torque demanded of the motor 4 must therefore be as constant as possible. A nearly constant torque is achieved given the spindle drive of the invention in that the thread sidewalls of the spindle thread and of the nut thread mesh with a defined pressing power, and in that the "resilient" slack of the spindle nut 5 does not allow any torque spikes to occur as a consequence of a seizing between spindle 1 and spindle nut 5.

Given employment of the spindle drive of the invention in, for example, a recording device with a start/stop mode, a high uniformity of the linear motion of the table or carriage as well as a high positioning precision and, thus, a good recording quality overall can thus be advantageously achieved.

Although various minor modifications might be suggested by those skilled in the art, it should be understood that my wish to embody within the scope of the patent warranted hereon all such modifications as reasonably and properly come with the scope of my contribution to the art.

What is claimed is:

1. A spindle drive, comprising:

a spindle and a spindle nut running on the spindle for high-precision drive of a linearly movable device;

the spindle nut having a base block connected to the movable device with a bore proceeding axially relative to the spindle for a loose passage of the spindle therethrough;

a slide nut segment arranged at the base block having a thread supported at the spindle;

a resiliently held, further slide nut segment having a thread resiliently supported at the spindle;

the slide nut segment being adjustably and fixably arranged at the base block;

at least two slide feet displaceable in an axial direction arranged perpendicular to the axial direction between the slide nut segment arranged at the base block and the further slide nut segment;

an adjustment mechanism with which the resiliently held further slide nut segment is displaceable in an axial direction of the spindle relative to the slide nut segment arranged at the base block;

the base block, the slide nut segment, adjusting mechanism and the further slide nut segment being designed and arranged with respect to each other such that dependent on a selectable first direction of linear motion, a first thread side wall of the thread of the slide nut segment lies against a first thread side wall of a thread of the spindle pushing in a direction of the linear motion and a second thread side wall of the thread of the further slide nut segment being pressed with a defined force against a second thread side wall of the thread of the spindle not pushing in the direction of the linear motion, and in a second direction of linear motion opposite the first, the second thread side wall of the thread of the slide nut segment lies against the second thread side wall of the thread of the spindle pushing in the second direction of the linear motion and a first thread side wall of the thread of the further slide nut segment being pressed with a defined force against the first thread side wall of the thread of the spindle not pushing in the second direction of the linear motion;

the resiliently held further slide nut segment is prestressed with tension springs relative to the slide nut segment arranged at the base block;

four tension springs are provided, first ends of the springs being respectively secured in pairs to two end faces of the further slide nut segment;

second ends of the two tension springs secured to one of the end faces of the further slide nut segment facing toward the base block being fixed to the base block; and second ends of the two tension springs secured to the other end face of the further slide nut segment facing away from the base block being respectively fixed to said slide nut segment and to another slide nut segment adjacent said slide nut segment.

2. The spindle according to claim 1 wherein at least another slide nut segment is arranged at the base block.

3. The spindle drive according to claim 1 wherein the slide nut segment connected to the base block is arranged above the spindle.

4. The spindle drive according to claim 1 wherein the resiliently held further slide nut segment is arranged under the spindle.

5. The spindle drive according to claim 1 wherein the slide nut segment is fixed to the base block with at least one screw.

6. The spindle drive according to claim 1 wherein the slide nut segment and further slide nut segments are supported at a generated surface of the spindle.

7. The spindle drive according to claim 1 wherein thread profiles of the slide nut segment and further slide nut segments and the spindle are approximately the same.

8. The spindle drive according to claim 1 wherein thread channels of the slide nut segments and further slide nut segment and spindle have an axial slack.

9. The spindle drive according to claim 1 wherein:
the slide feet are attached to an outside surface of a closure cover that is secured to an end face of the further slide nut segment facing toward the base block; and
the slide feet are supported at the base block.

10. The spindle drive according to claim 1 wherein the slide nut segment and further slide nut segment are formed as a hollow cylinder that extend in an axial direction of the spindle.

11. A spindle drive, comprising:
a spindle and a spindle nut running on the spindle for high-precision drive of a linearly movable device;
the spindle nut having a base block connected to the movable device with a bore proceeding axially relative to the spindle for a loose passage of the spindle therethrough;
a slide nut segment arranged at the base block having a thread supported at the spindle;
a resiliently held, further slide nut segment having a thread resiliently supported at the spindle;
the slide nut segment being adjustably and fixably arranged at the base block;
at least two slide feet displaceable in an axial direction arranged perpendicular to the axial direction between the slide nut segment arranged at the base block and the further slide nut segment;
an adjustment mechanism with which the resiliently held further slide nut segment is displaceable in an axial direction of the spindle relative to the slide nut segment arranged at the base block;
the base block, the slide nut segment, adjusting mechanism and the further slide nut segment being designed and arranged with respect to each other such that dependent on a selectable first direction of linear motion, a first thread side wall of the thread of the slide nut segment lies against a first thread side wall of a thread of the spindle pushing in a direction of the linear motion and a second thread side wall of the thread of the further slide nut segment being pressed with a defined force against a second thread side wall of the thread of the spindle not pushing in the direction of the linear motion, and in a second direction of linear motion opposite the first, the second thread side wall of the thread of the slide nut segment lies against the second thread side wall of the thread of the spindle pushing in the second direction of the linear motion and a first thread side wall of the thread of the further slide nut segment being pressed with a defined force against the first thread side wall of the thread of the spindle not pushing in the second direction of the linear motion; and the adjustment mechanism being formed of the following components;
a connecting rod seated in the base block and axially displaceable,
a thrust element connected to the connecting rod, and
a compression spring arranged at each side of the thrust element and embracing the connecting rod, said compression springs being supported at the thrust element and the further slide nut segment, and one of the springs respectively exerting an axial thrust force on the further slide nut segment greater than any thrust force of the other spring dependent on the axial position of the thrust element.

12. A spindle drive, comprising:
a spindle and a spindle nut running on the spindle for high-precision drive of a linearly movable device;
the spindle nut having a base block connected to the movable device with a bore proceeding axially relative to the spindle for a loose passage of the spindle therethrough;
a slide nut segment arranged at the base block having a thread supported at the spindle;
a resiliently held, further slide nut segment having a thread resiliently supported at the spindle;
the slide nut segment being adjustably and fixably arranged at the base block;
at least two slide feet displaceable in an axial direction arranged perpendicular to the axial direction between the slide nut segment arranged at the base block and the further slide nut segment;
an adjustment mechanism with which the resiliently held further slide nut segment is displaceable in an axial direction of the spindle relative to the slide nut segment arranged at the base block;
the base block, the slide nut segment, adjusting mechanism and the further slide nut segment being designed and arranged with respect to each other such that dependent on a selectable first direction of linear motion, a first thread side wall of the thread of the slide nut segment lies against a first thread side wall of a thread of the spindle pushing in a direction of the linear motion and a second thread side wall of the thread of the further slide nut segment being pressed with a defined force against a second thread side wall of the thread of the spindle not pushing in the direction of the linear motion, and in a second direction of linear motion opposite the first, the second thread side wall of the thread of the slide nut segment lies against the second thread side wall of the thread of the spindle pushing in the second direction of the linear motion and a first thread side wall of the thread of the further slide nut segment being pressed with a defined force against the first thread side wall of the thread of the spindle not pushing in the second direction of the linear motion;

the slide feet being attached to an outside surface of a closure cover that is secured to an end face of the further slide nut segment facing toward the base block;

the slide feet are supported at the base block; and the closure cover being adjustably attached to the further slide nut segment.

* * * * *